US012182085B1

(12) United States Patent
Biagioli et al.

(10) Patent No.: US 12,182,085 B1
(45) Date of Patent: Dec. 31, 2024

(54) SPATIAL DATA SIMPLIFICATION AND STORAGE

(71) Applicant: Amazon Technologies, Inc., Seattle, WA (US)

(72) Inventors: Eric Javier Biagioli, Berlin (DE); Menelaos Karavelas, San Ramon, CA (US); Nemanja Boric, Berlin (DE); Hinnerk Gildhoff, Heidelberg (DE); Ioanna Tsalouchidou, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 314 days.

(21) Appl. No.: 17/025,989

(22) Filed: Sep. 18, 2020

(51) Int. Cl.
*G06F 16/00* (2019.01)
*G06F 16/215* (2019.01)
*G06F 16/22* (2019.01)
*G06F 16/29* (2019.01)

(52) U.S. Cl.
CPC .......... *G06F 16/215* (2019.01); *G06F 16/221* (2019.01); *G06F 16/29* (2019.01)

(58) Field of Classification Search
CPC ....... G06F 16/215; G06F 16/221; G06F 16/29
See application file for complete search history.

(56) References Cited

U.S. PATENT DOCUMENTS

| | | | | |
|---|---|---|---|---|
| 2012/0206469 | A1* | 8/2012 | Hulubei | G01C 21/3867 345/581 |
| 2015/0161438 | A1* | 6/2015 | Geringer | G06V 10/751 382/113 |
| 2016/0005141 | A1* | 1/2016 | Kazmaier | G06F 16/51 345/530 |
| 2016/0133049 | A1* | 5/2016 | Hill | G06T 19/20 700/98 |
| 2021/0271474 | A1* | 9/2021 | Batra | G06F 17/13 |

FOREIGN PATENT DOCUMENTS

CN 101930483 * 7/2012

* cited by examiner

*Primary Examiner* — Dinku W Gebresenbet
(74) *Attorney, Agent, or Firm* — Davis Wright Tremaine LLP

(57) ABSTRACT

A system, technique, or computer program product generates a simplified version of a geometry, based on a target number of points to be included in the output. A first plurality of points, representative of a geometry, is received. The simplified version of the geometry is generated by, at least, expanding a segment of a simplified version of the geometry. The segment is identified for expanding by determining that a point associated with the segment is at a distance from the segment that exceeds a tolerance value, and is includable in the simplified version of the geometry without causing the simplified version of the geometry to exceed the target size.

20 Claims, 13 Drawing Sheets

```
void GeometricSimplification( std::vector<P> const& pts, double tolerance,
                              std::vector<bool>& keep, int from, int to) { std::queue<std::pair<int, int>> nexts;

nexts.push(std::make_pair(from, to));
    keep[from] = true;
    keep[to] = true;
    while (!nexts.empty()) {
        auto [from, to] = nexts.front();
        nexts.pop();

if (to - from <= 1)
            continue;

int max_i = -1;
        double max_d = -1.0;
        for (int i = from + 1; i < to; i++) {
            double d = distance_to_line(pts[i], pts[from], pts[to]);
            if (d > max_d) {
                max_d = d;
                max_i = i;
            }
        } if (max_d > tolerance) {
            keep[max_i] = true;
            nexts.push(std::make_pair(from, max_i));
            nexts.push(std::make_pair(max_i, to));
        }
    }
}
```

FIG. 5

```
struct Node { int from, to, max_i; double max_d; }

Node compute_node(points, from, to)
{
        Node ret := Node[from = from, to = to, max_d = -1.0, max_i = -1]
        for i = from + 1 .. to-1
                dist = distance_to_line(points[i], points[from], pointts[to]);
                if (dist > ret.max_d)
                        ret.max_d = d;
                        ret.max_i = i;
        return ret;
}

Input:
        points: (std::vector<Point> const &) ordered list of points.
        percentage: (double) desired compression ratio.
        from: (int) index from which 'points' should be simplified
        to: (int) index to which 'points' should be simplified Output:
        keep: (std::vector<bool>&) vector of booleans, with as many entries as 'points'.
        keep[i] indicates if points[i] should be kept according to D-P. 'keep' is initialized
        externally to have the same number of entries than 'points', and to have all of them
        being 'false'.

GeometricSimplification( (IN) points, (IN) percentage, (IN) from, (IN) to, (OUT) keep );
```

FIG. 6

```
GeometricSimplification( (IN) points, (IN) percentage, (IN) from, (IN) to, (OUT) keep )
{
        nexts :=     QUEUE of nodes to be expanded by D-P.
        stops :=     MAX-HEAP of simplificable nodes, where the computation has stopped.
                     The comparison to define the max-heap is the field MaxD of the nodes.

Node initial := compute_node(pts, from, to)
        PUSH(stops, initial)
        tolerance := +infty
        target_nPoints := percentage * points.size()
        nPoints := 0;

while !EMPTY(stops) and nPoints < target_nPoints
        {
                // reduce the tolerance
                tolerance = ROOT(stops)->max_d;

// add to nexts all the nodes that are enabled by the new tolerance (usually
                // just one)
                while !EMPTY(stops) and ROOT(stops)->max_d == tolerance
                {
                        PUSH(nexts, ROOT(stops))
                        REMOVE-ROOT(stops)
                }

// D-P with the new tolerance and the initial set of nodes 'nexts'
                while !EMPTY(nexts)
                {
                        next := POP(nexts)
                if next.to - next.from <= 1
                        continue
                if next.max_d >= tolerance
                {
                        nPoints++
                        nexts.push(compute_node(points, next.from, next.max_i))
                        nexts.push(compute_node(points, next.max_i, next.to))
                }
                else
                        PUSH(stops, n);
        }
}
```

SPATIAL DATA SIMPLIFICATION AND STORAGE

BACKGROUND

Cartographic and other forms of spatial information are increasingly being stored in hosted database systems. These systems may store vast quantities of data, and provide data access capabilities to large numbers of client applications. The efficient utilization of storage capacity on processor time is, therefore, of significant consequence to such systems. Spatial information, however, can impose significant burdens on such systems. Consequently, improvements to the efficiency of handling spatial information may be beneficial.

BRIEF DESCRIPTION OF THE DRAWINGS

Various techniques will be described with reference to the drawings, in which:

FIG. 5 illustrates an example of pseudo-code for simplifying a geometry, in accordance with at least one embodiment;

FIG. 6 illustrates aspects of an additional example of pseudo-code for simplifying a geometry, in accordance with at least one embodiment;

FIG. 7 illustrates further aspects of this additional example, in accordance with at least one embodiment;

DETAILED DESCRIPTION

Figure 1:
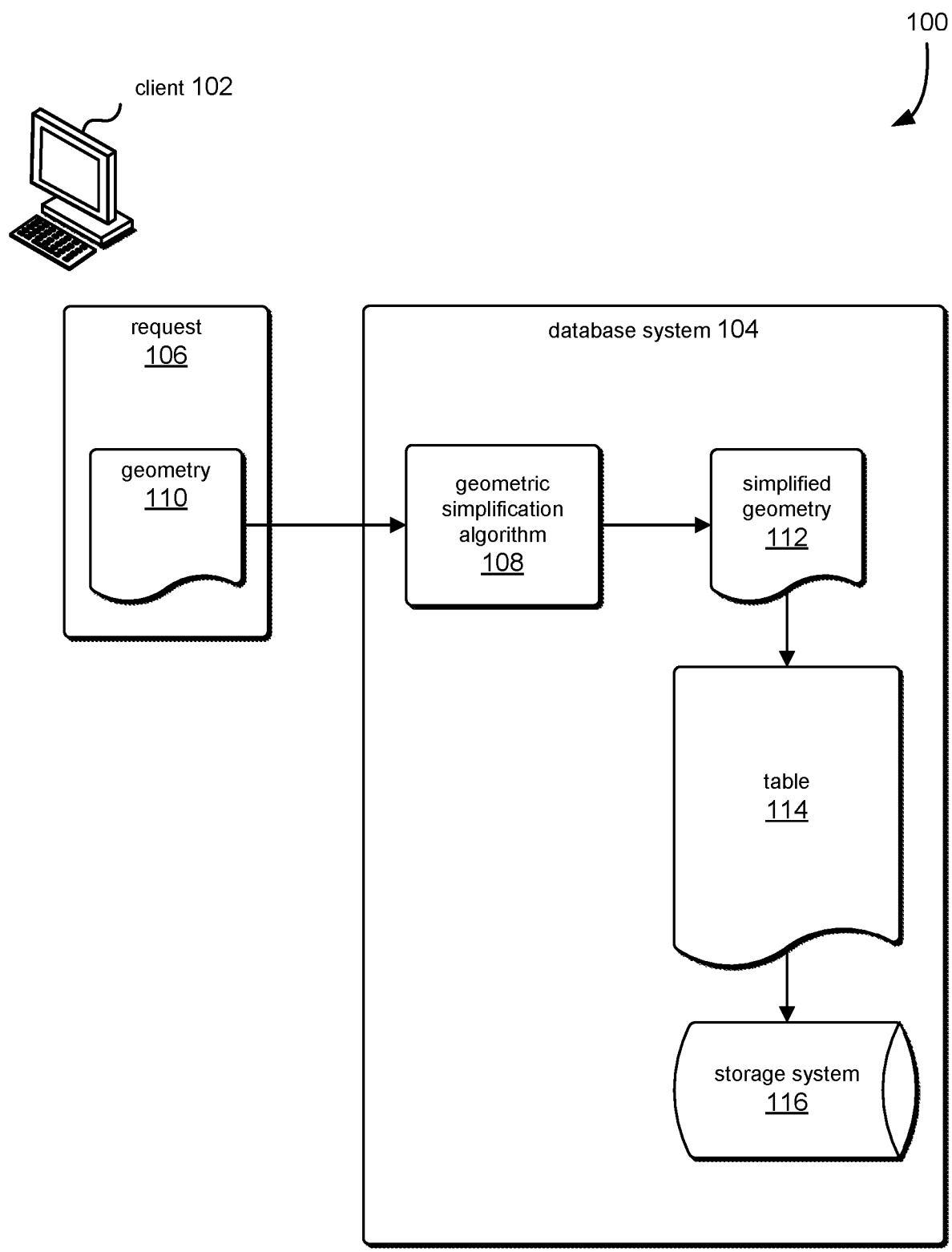
FIG. 1 illustrates an example of a system for storing spatial information, in accordance with at least one embodiment.

In at least one embodiment, a database system stores size-constrained spatial information by taking an input geometry I and computing an output geometry O such that O is similar to I and contains no more than some maximum number of points, or otherwise does not cause O to exceed a target size. The maximum number of points may be determined by storage available for the geometric data. For example, geometric data might be used to describe the geographic boundaries of an area represented by a zip code. A table of data might be indexed by zip code and contain a column of geometric data which, for a given zip code, represents the geographic boundaries of the corresponding zip code. The space allocated for a column of a row might be limited, so that for a given row, no more than some maximum number of points may be used to describe the geographic area that corresponds to the row's zip code.

In at least one embodiment, output geometry O is similar to input geometry I, where similarity refers to the output geometry O approximating the input geometry I. In general terms, a simplified version of an input geometry is one in which important details (such as the geometries overall shape) are retained, while less important details are discarded. In at least one embodiment, the amount of detail retained in a simplified version of an input geometry is governed by one or more parameters, such as a tolerance value.

In some cases, a function to generate an output geometry O from an input geometry I is based on a function which divides/into a number of segments, and for each segment determines whether points within the segment should be included or excluded from the simplified version of the geometry. In at least one embodiment, a given segment corresponds to a line from a starting point TO, to an endpoint FROM. Each point, in this embodiment, may be evaluated with respect to a distance from this line. If the distance is greater than a tolerance value, the point may be retained. If the distance is less than the tolerance value, the point may be discarded. As such, smaller tolerances will tend to result in larger geometries, and larger tolerances will tend to result in smaller geometries. It may be advantageous, however, to be able to generate a simplified version of a geometry using an algorithm that is capable of ensuring that its output includes no more than a maximum number of points, rather than one that outputs a simplified geometry whose size is unpredictable.

In at least one embodiment, an embodiment incorporating one or more techniques described herein may be adapted to simplify an input geometry such that a simplified output geometry contains no more than a maximum number of points. In at least one embodiment, the output geometry attempts to use as many points as possible, so that maximal detail is retained, while still using less than the maximum number of points. In at least one embodiment, an embodiment incorporating one or more techniques described herein can, alternatively, generate a simplified output geometry given a maximum number of points N, generate a simplified output geometry given a ratio of compression r, or compute a map of intervals of tolerance to indicate how many points a simplified output geometry would have, given a tolerance value.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example of a system for storing spatial information, in accordance with at least one embodiment. In the example 100 of FIG. 1, a database system 104 provides capabilities for storing and retrieving data. The database system 104 can include or support any of a number of database technologies and database access paradigms or methodologies, including relational databases, non-relational databases, NoSQL databases, data warehouses, databases specialized for storing spatial data, and various other kinds of database and data storage systems.

In at least one embodiment, the database system 104 is capable of storing a number of different data types, such as strings, integers, floating point numbers, objects, and so forth. These data types may also include various data types for storing spatial, geographic, and geometric information. Examples of this type of information include, but are not limited to, two and three dimensional coordinate data, latitude and longitude data, polar coordinate data, and so forth. Data types for storing spatial, geographic, and geometric data may be specialized, including data types specifically designed to store such data. Alternatively, data types for storing spatial, geographic, and geometric data may be generic, such as two, three, or multidimensional arrays of integers or floating point numbers. In general, regardless of which underlying data type is used, spatial, geographic, and geometric data tends to be stored, or can be represented as, ordered lists of points that correspond to a geometry. A geometry, in general terms, defines the boundaries of a shape, such as a square, triangle, polygon, and so forth, or the contours of a line. In practical applications, these shapes and contours may be very complex and varied, and may require many points, sometimes referred to as vertices, to be accurately and fully represented. The term geometry, as used herein, can be used in association with any of a wide variety of spatial, geographic, and geometric forms.

In at least one embodiment, a client 102 submits a request 106 to store a geometry. The request may comprise a command, such as a structure query language ("SQL") INSERT command or NoSQL "PUT" command, to store the geometry in a table 114, or other equivalent structure, such as a key-value collection of data. The request 106 may also, in some cases, be a command to store a plurality of geometries, or single geometry comprising multiple shapes, lines, and so forth.

In at least one embodiment, the geometry 110 is to be stored in a column of a row of the table 114. In the case of embodiments which utilize a non-relational structure, such as a NoSQL database, the geometry 110 may be stored, in some cases, as a property or value associated with a key. Regardless of which form is used, there may often be various limitations and constraints imposed by the computational and storage capacity of the database system 104 and the storage system 116. For example, there may be a limit, for any given column of a row, on how much space is available to store a given geometry. The geometry 110 may, however, be very large.

A geometric simplification algorithm 108 may be applied, in some cases, to the geometry 110 to produce a simplified geometry 112 that can be stored in table 114 in view of any size or complexity constraints. For example, the geometric simplification algorithm 108 might be used to limit the size of spatial data to less than some maximum number of points, so that the spatial data fits within the amount of space allocated to a column of a row. In at least one embodiment, the size of spatial information is limited in order to improve query efficiency. Size may be used to refer to the number of points in a simplified version of a geometry, or to some other quantitative factor, such as the amount of memory needed to represent a simplified version of a geometry.

The geometric simplification algorithm 108 may be invoked in any of a wide variety of ways. In at least one embodiment, the algorithm is implemented by a command in a query language. In another embodiment, the algorithm is implemented as a function of an object. In another embodiment, the algorithm is applied automatically by the database system 104.

Figure 2:
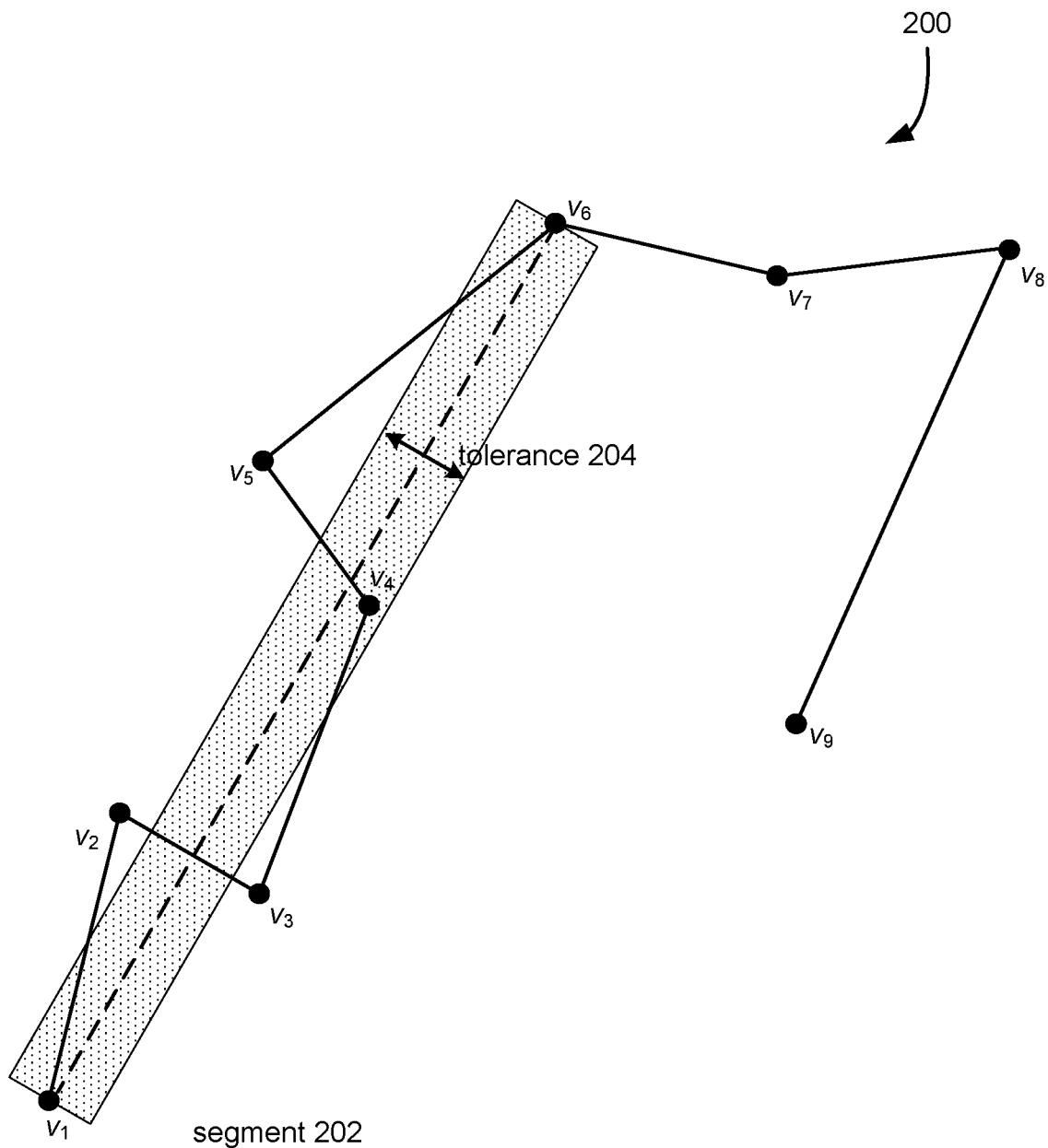
FIG. 2 illustrates an example of a geometry 200, in accordance with at least one embodiment.

FIG. 2 illustrates an example of a geometry 200, in accordance with at least one embodiment. In at least one embodiment, a segment of a geometry is defined by two points $p_1$ and $p_2$ and has an associated tolerance $\varepsilon$. The tolerance $\varepsilon$ may in turn define a tolerance range, which may describe a maximum distance from a centerline of the segment. In at least one embodiment, the tolerance range is $\varepsilon/2$ from the centerline. The segment may be associated with a rectangle with two sides parallel to $\overline{p_1p_2}$ and at a distance $\varepsilon/2$ from $\overline{p_1p_2}$. The other two side of this rectangle are perpendicular to these, and cross through $p_1$ and $p_2$, respectively.

In the example geometry 200 depicted in FIG. 2, a segment 202 is defined by points $v_1$ and $v_6$ and has associated tolerance $\varepsilon$ 204 and tolerance range $\varepsilon/2$. It may be noted that certain points, such as $v_4$, fall within the rectangle and are therefore at a distance that is less than, or inside of, the tolerance range, while other points, such as $v_2$, fall outside the rectangle and are therefore at a distance that is outside of the tolerance range. In at least one embodiment, points falling within the tolerance range may be considered to be adequately represented by the line $\overline{v_1v_6}$, while points falling outside of the tolerance range may be considered to not be adequately represented by $\overline{v_1v_6}$, at least in view of the current tolerance 204.

In at least one embodiment, the segment corresponding to line $\overline{v_1v_6}$ may be expanded, or subdivided, to more accurately represent points $v_2$, $v_3$, $v_5$. For example, the segment 202 might be expanded into additional segments such as $\overline{v_1v_4}$ and $\overline{v_4v_6}$. These two new segments might collectively include a greater number of points than the unexpanded segment 202, but may not include all of points $v_1$ through $v_6$. However, one or both of these segments might be further expanded to include additional points within a defined tolerance 204.

In at least one embodiment, the tolerance 204 might also be adjustable so that a greater number of points are within the tolerance range associated with segment 202. For example, in FIG. 2, if the tolerance 204 were expanded somewhat, the rectangle defined by segment 202 might be made to include points $v_2$ and $v_3$. In general terms, as the tolerance 204 increases, so too does the number of points that might be represented by a segment, such as the depicted segment 202. Conversely, as the tolerance 204 decreases, so too does the number of included points. For example, at an infinite tolerance value, a single segment might represent all of geometry 200, while at a tolerance of zero, a segment could represent no more than two points.

One approach to generating a simplified geometry is the Ramer-Douglas-Peucker or Douglas-Peucker ("D-P") algorithm. In this approach, the D-P algorithm receives an ordered list of vertices and a tolerance as parameters, and produces as output the same list that it received as input, with some of the points excluded. If vi and vj are the first and last vertices in the input list, the D-P algorithm checks to see if a rectangle defined by $\overline{v_iv_j}$, $\varepsilon$ can be simplified, meaning that it encompasses all vertices between vi and vj. If so, this is done. If not, the D-P algorithm computes a value k (i<k<j) such that the point vk maximizes the distance from the line $\overline{v_iv_j}$. The point $v_k$ is marked as non-removable, and recursively simplifies the two sub-lists $v_i \rightarrow \ldots v_k$ and $v_k \rightarrow \ldots$ $v_j$. Notably, this technique does not limit the outputted list to any particular number of points.

Figure 3:
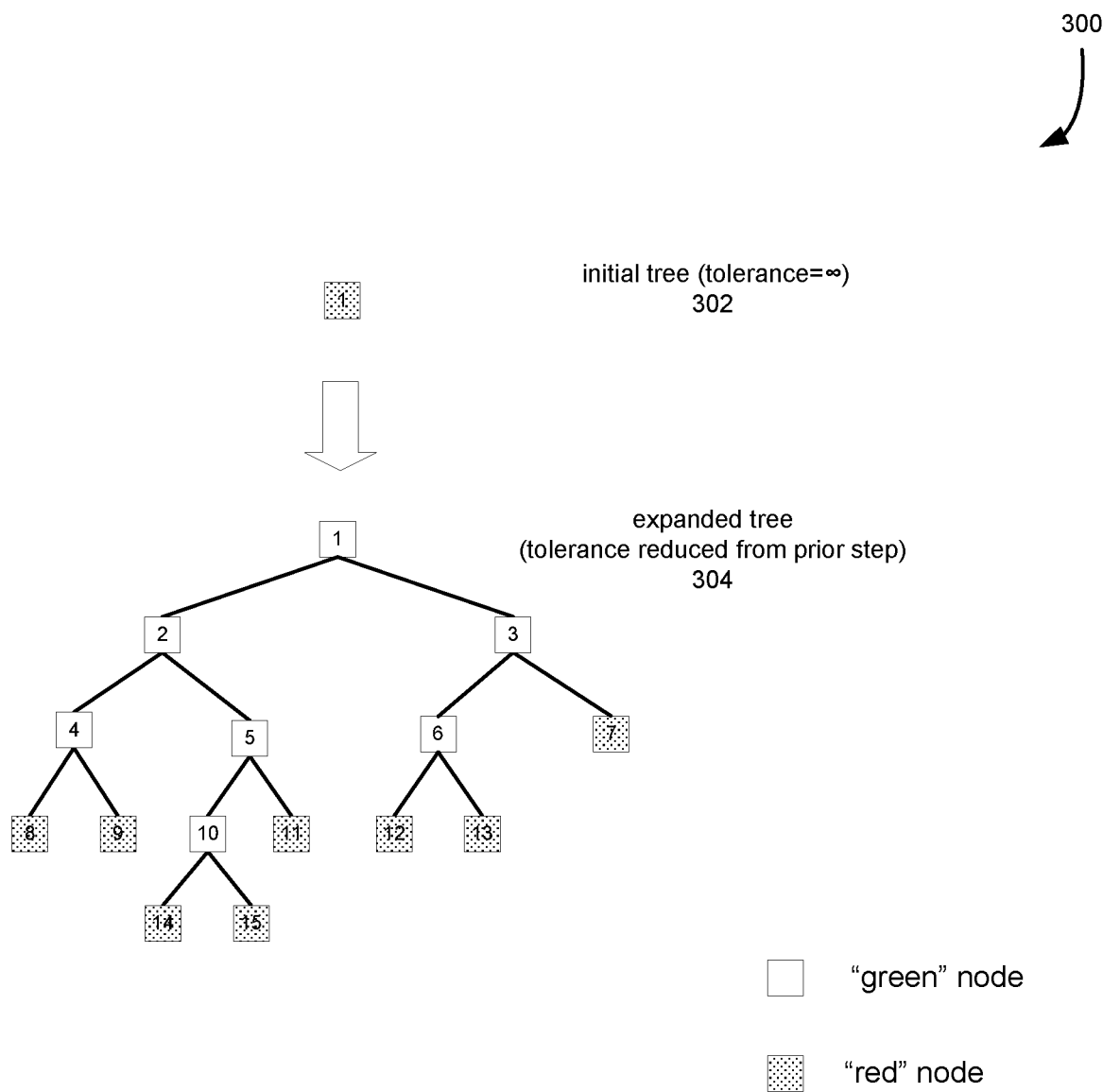
FIG. 3 illustrates an example of size-limited geometric simplification, in accordance with at least one embodiment.

FIG. 3 illustrates an example of size-limited geometric simplification, in accordance with at least one embodiment. In the depicted example 300, an initial tree 302 comprises a single root node, corresponding to a single segment of a geometry based on an assumed tolerance of infinity. For example, referring back to FIG. 2, the geometry of points $v_1$ through $v_9$ could be represented by the segment $\overline{v_1 v_9}$ if tolerance $\varepsilon = \infty$, since none of the points $v_2$ through $v_8$ would fall outside of the resulting infinite tolerance range. In at least one embodiment, the root node is marked, e.g., as "red," to indicate that it can be simplified and could, potentially, be included in a stop set. Here, the stop set refers to a set of nodes having FROM and TO points that, once the stop set is finalized, are included in the final geometry.

In at least one embodiment, an expanded tree 304 may result from reducing the tolerance range from infinity to some new value of $\varepsilon$, such that at least some points in the geometry fall outside of the resulting tolerance range. In at least one embodiment, the tolerance is reduced based on N.MaxD, where N represents the node from the previous step for which MaxD is maximum, and MaxD is the maximum distance of any point associated with N, or the segment it represents. In the example 300, the initial tree 302 has only one node, so N is the root node and MaxD is the distance of the point farthest from the line defined by the FROM and TO points of the segment associated with the root node. For example, referring back to FIG. 2, if the root node represents a segment with the line $\overline{v_1 v_9}$, then MaxD could be obtained by identifying which one of points $v_1$ through $v_8$ is farthest from $\overline{v_1 v_9}$ and calculating its distance from that line.

As depicted in the example 300 of FIG. 3, the expanded tree 304 may have a number of additional nodes. Some of these may be classifiable as "green" nodes, referring to nodes that have been expanded, while others may be marked as "red" nodes that could be included in the stop set.

In at least one embodiment, the nodes marked "red" can be used to generate a resulting simplified geometry, and similarly can be used to determine how many points would be including in such a geometry, if it were generated. If this number does not exceed the targeted number of points, the tree may be further expanded.

Figure 4:
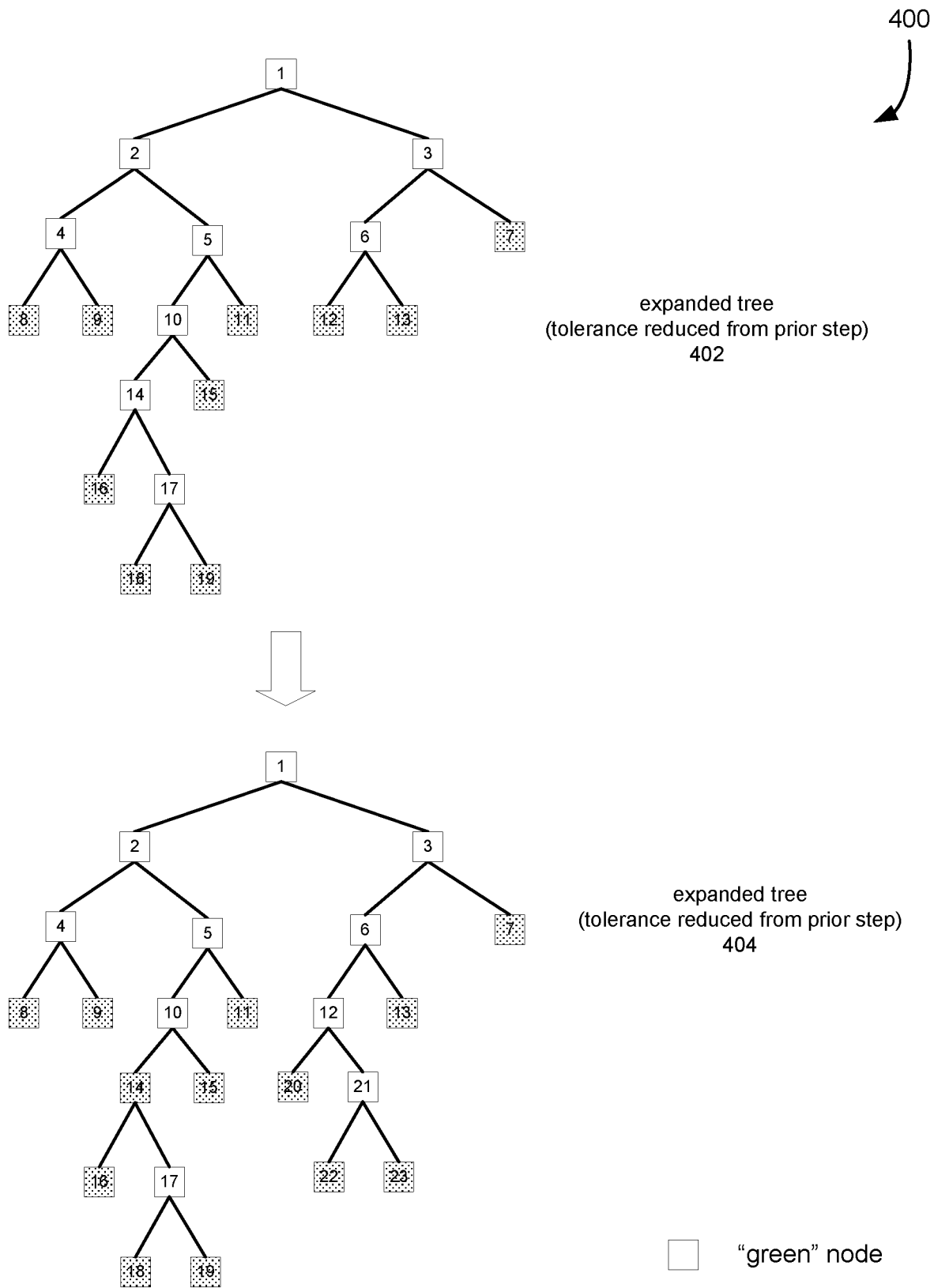
FIG. 4 illustrates further aspects of an example of size-limited geometric simplification, in accordance with at least one embodiment.

FIG. 4 illustrates further aspects of an example of size-limited geometric simplification, in accordance with at least one embodiment. In particular, it shows continued expansion of the tree 304 depicted in FIG. 3. There, node N has been selected, as N=14, from among the red nodes of tree 304. The tolerance is then reduced to N.MaxD, and the read nodes of tree 304 are analyzed and potentially expanded. This might result in expanded tree 402, resulting in the addition of nodes 15-19 based on the newly reduced tolerance value.

Assuming that a simplified geometry based on the "red" nodes would have fewer than the maximum number of points, expansion can continue by further reducing the tolerance value to N.MaxD, where in this case N=12. This could result in expanded tree 404. If the resulting simplified geometry, based on the "red" nodes in expanded tree 404, would equal or exceed the desired maximum number of nodes, the expansion process can then stop. A simplified geometry can then be generated based primarily on the "red" nodes of expanded tree 404, or from the "red" nodes of the prior tree 402. Alternatively, selected "red" nodes from the final tree 404 can be unexpanded, so that a simplified geometry based on the remaining red nodes contains no more than the maximum number of points, or that the resulting simplified geometry contains a number of points that falls within a desired range.

FIG. 5 illustrates an example of pseudo-code for simplifying a geometry, in accordance with at least one embodiment. The example 500 is a non-recursive simplification algorithm. The example 500, rather than directly computing a simplified geometry, computes a vector<bool> with one entry for each corresponding point of the input geometry. Each entry in the vector<bool> indicates whether a corresponding point should or should not be removed from the output geometry. This may be beneficial in various ways, including that it helps keep the input generic. After the depicted code computes the vector of Booleans, it can be scanned and used to create a resulting simplified list of points.

FIG. 6 illustrates an additional example of pseudo-code for simplifying a geometry, in accordance with at least one embodiment. FIG. 7 illustrates further aspects of this example. The depicted example allows a user to specify a desired size of the output instead of a tolerance.

To implement an algorithm, such as the one depicted in the pseudo code of FIGS. 6 and 7, that is driven by desired size rather than tolerance, it may be observed that the size of the output is monotonically non-increasing when the tolerance increases from 0 to $\infty$. This might be exploited using bisection. As such, one implementation might comprise calling a geometric simplification algorithm, such as D-P, with too big and too small tolerance values and executing a modified binary search to find a tolerance value that produces the output size closest to the desired output size, without exceeding it. However, this approach may be inefficient.

In at least one embodiment, a geometric simplification algorithm, such as D-P, utilizes bisection. One way of visualizing D-P is to imagine calls to D-P as nodes of a tree containing the values FROM, TO, MaxD, and MaxI. Here, MaxD is the maximum distance between the line $\overline{FROM,TO}$ and the vertices that are between FROM and TO in the input. MaxI is the corresponding vertex. When MaxD is greater than the tolerance, D-P may mark the vertex as important and does not remove it from the output list.

A node of a tree may be referred to as being simplifiable. This refers to a rectangle determined by the node's FROM and TO vertices, and the tolerance range. The node can be considered simplifiable if points between the FROM and TO vertices fall within the rectangle.

In at least one embodiment, an execution of a geometric simplification algorithm, with a given tolerance ¿, is described by a tree T. Execution of a geometric simplification algorithm with the same input and a smaller tolerance may produce a version of T in which one or more leaves are expanded, depending on the position of the various points vis-a-vie the tolerance. If the tolerance is decreased continuously, for example in stepwise or iterative fashion, there will be a point at which one or more of the leaves of T will be expanded. The expanded leaves will be those that have the largest MaxD. If the tolerance is bigger than or equal to MaxD, then the node with that MaxD is simplifiable and is also a leaf node that does not need to be expanded at the current tolerance. However, when decreasing the tolerance, there will eventually be a point at which nodes that were previously inactive and activated, and can be expanded. To incrementally change T by the smallest amount, the smallest change needed will be the change implied by the next-biggest MaxD. Any other MaxD would expand one or more additional nodes of T.

In at least one embodiment, with this observation, tolerance can initially be set to ∞ or some suitably large value, and proceed iteratively. On each step, tolerance can be decreased to the next-biggest MaxD. This action turns green, or activates or marks for expansion, the leaves of the tree that have an associated MaxD equal to the new tolerance. When a node becomes green, it can be expanded. This can be repeated until the size of the output equals or approximates the desired size. This process will eventually terminate, because the number of next-biggest MaxD values is finite.

Accordingly, in at least one embodiment, a geometric simplification algorithm can be stated as a traversal of a tree with nodes of the form (FROM, TO, MaxD, MaxI). The algorithm expands nodes in which MaxD>ε (where ε is the tolerance), and does not expand nodes where MaxD≤ε. Note also that additional points of the input geometry are associated with each node, specifically those points of the geometry that are ordered between FROM and TO.

In at least one embodiment, in order to run just once and produce an output of the desired size, a geometric simplification algorithm may begin with an initial tolerance of infinity and proceed iteratively by steps. At each step, the tolerance may be reduced and the algorithm continues from the status in which the previous step terminated. The new value of the tolerance at each step may be the next tolerance in which the tree of the algorithm will have changes. This strategy of execution can be used to ensure the same output as the D-P algorithm for the current tolerance at each step.

In at least one embodiment, the algorithm is only interrupted after each iteration terminates. That is, the algorithm only stops after the new tree is fully computed, rather than in the middle of an iteration. One consequence of this is that the number of output points is approximate during each iteration. It is only at the endpoints of this interval that the sizes of the outputs will differ. By decreasing the tolerance, the number of points remains the same until a point in which it suddenly increases. This is due to MaxD not changing monotonically as the tolerance decreases, since reducing the tolerance could enable several sub-trees, rather than only one node. Accordingly, in at least one embodiment, when a specific number of points is targeted, the resulting number of actual points may be exceeded, although in practice, the size of the output is likely to be very close to the desired size. To ensure that no more than a maximum number of points are included in the resulting geometry, additional processing may be done, such as reverting to a prior iteration or selectively collapsing selected nodes.

Figure 8:
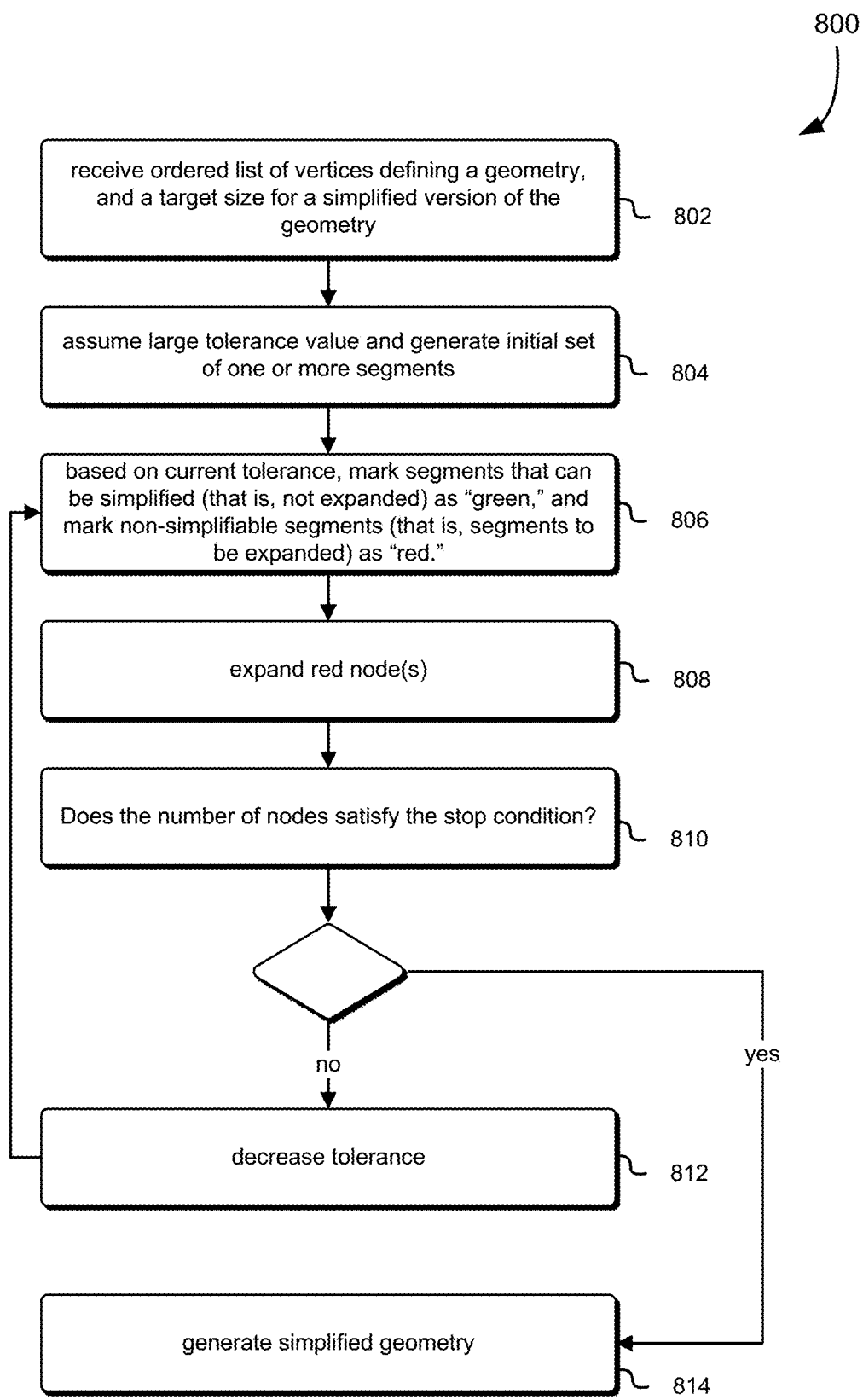
FIG. 8 illustrates an example process for simplifying a geometry, in accordance with at least one embodiment.

FIG. 8 illustrates an example process for simplifying a geometry, in accordance with at least one embodiment. The example process 800 may be performed by any suitable computing system or combination of systems, including for example the servers depicted in FIG. 13.

Although FIG. 8 is depicted as a series of steps or operations, the depicted sequence should not be viewed as limiting the scope of the present disclosure to only those embodiments that conform to the depicted sequence. For example, in various embodiments, the steps or operations depicted in the figure may be altered, reordered, or omitted, except where explicitly stated or where logically required, such as when an input to one step or operation is obtained from an output of another step or operation.

At 802, the system receives an ordered list of vertices defining a geometry, and a target size for a simplified version of the geometry.

At 804, the system assumes a large tolerance value and generates a tree or other structure to generate one or more segments of the geometry. In at least one embodiment, an infinite tolerance is assumed, resulting in a single segment. In other embodiments, the largest MaxD<∞ is used. In still other embodiments, some other value less than infinity is used.

At 806, segments that can be simplified, based on the current tolerance, are marked as "green," and other (non-simplifiable) segments are marked as "red." The green segments are those that do not need to be expanded. The "red" segments are those could be expanded, or that could make up the simplified version of the geometry, were the system to terminate the algorithm at this time.

At 808, the system expands one or more of the non-simplifiable "red" nodes. Examples of expanding non-simplifiable nodes are provided herein, such as with respect to FIGS. 3 and 4.

At 810, the system determines whether or not the size of a resulting output geometry would be within a desired range. For example, the system may, in some embodiments, determine that if a simplified geometry were to be generated from the current "red" nodes, the resulting geometry would be within some percentage of the target size. In at least one embodiment, some factor other than or in addition to a target size may be used to determine when to terminate generation of the simplified geometry. For example, in at least one embodiment, the current version of a geometry (e.g., as expressed by the "red" segments of the current version of the geometry) may be evaluated according to some suitability criteria.

At 812, the system decreases the tolerance. In at least one embodiment, the tolerance is decreased to the next-largest MaxD. The system then performs the operations of elements 806-810 again.

At 814, the system generates a simplified geometry based, at least in part, on the segments currently marked as "red."

In at least one embodiment, regarding the example process 800, segments are not explicitly marked as "red" or "green." Instead, these designations may simply reflect determinations made during application of the overall process regarding whether or not a segment is, or is not, simplifiable. Similarly, these designations may simply reflect whether or not the process 800 determines to expand a segment.

Figure 9:
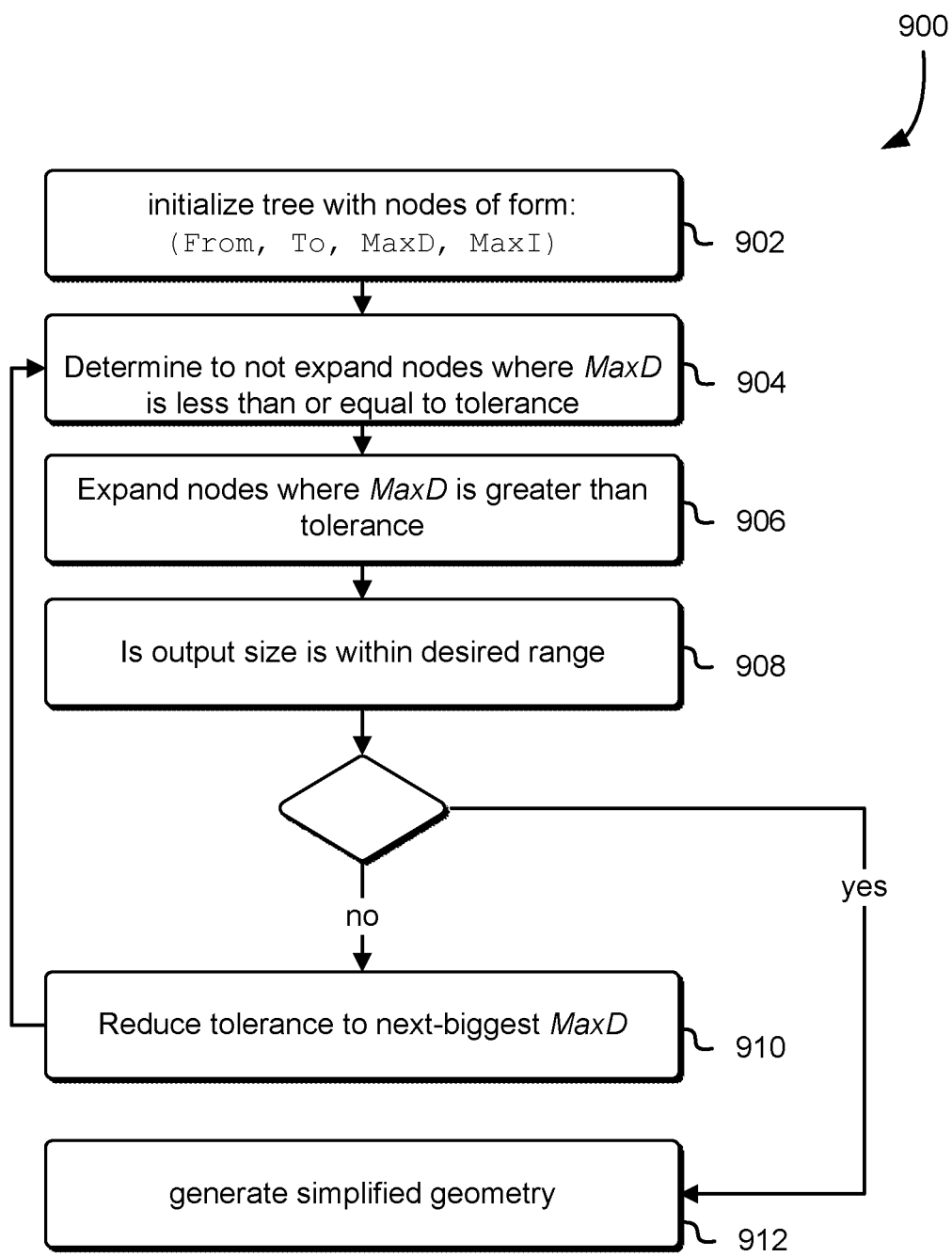
FIG. 9 illustrates an example process for simplifying a geometry by identifying nodes of a tree for expansion, in accordance with at least one embodiment.

FIG. 9 illustrates an example process for simplifying a geometry by identifying nodes of a tree for expansion, in accordance with at least one embodiment. The example process 900 may be performed by any suitable computing system or combination of systems, including for example the servers depicted in FIG. 13.

Although FIG. 9 is depicted as a series of steps or operations, the depicted sequence should not be viewed as limiting the scope of the present disclosure to only those embodiments that conform to the depicted sequence. For example, in various embodiments, the steps or operations depicted in the figure may be altered, reordered, or omitted, except where explicitly stated or where logically required, such as when an input to one step or operation is obtained from an output of another step or operation.

At 902, the system initializes a tree or other similar structure, with nodes or elements of the form (FROM, TO, MaxD, MaxI).

At 904, the system determines to not expand nodes of the tree where MaxD is less than or equal to the current tolerance.

At 906, the system expands nodes where MaxD is greater than the current tolerance.

At 908, the system determines whether the output size is within a desired range.

At 910, the system reduces the current tolerance to the next-biggest MaxD, and if the output size is not yet within the desired range, execution of the algorithm proceeds again to elements 904-908.

At 912, if the output size was within the desired range, the system generates a simplified geometry.

Certain techniques described herein, such as the examples processes depicted in FIGS. 8 and 9, will allow termination of a geometric simplification algorithm when the output is of the desired size, and may also allow computation of a tolerance value which could be used by an algorithm, such as D-P, to get similar or identical output. This applies to a particular ordered list of points. However, if there is a geometry or set of geometries that comprises several ordered lists of points, and a geometric simplification algorithm is called for each list independently, the resulting output tolerances may different for each case.

Figure 10:
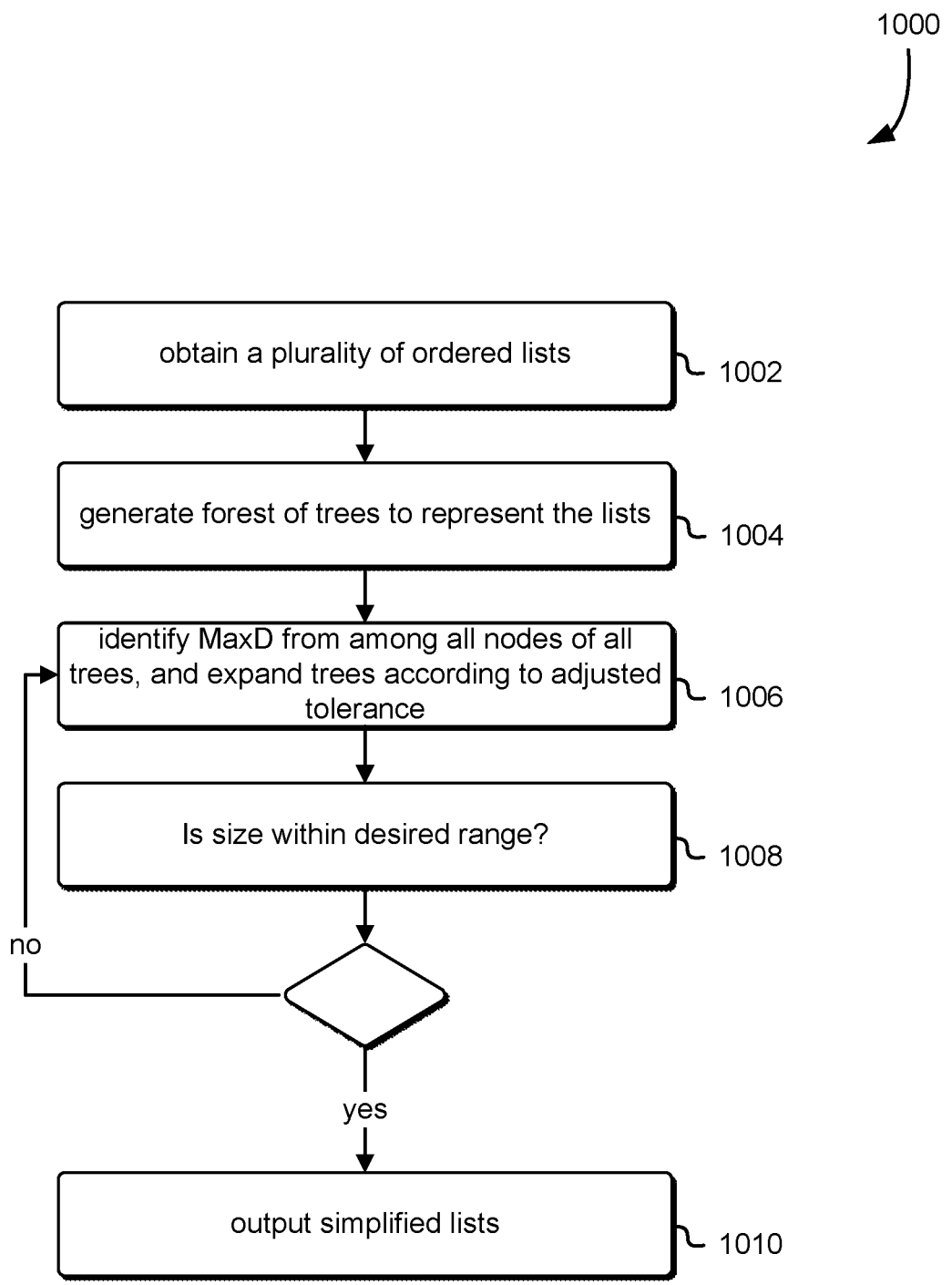
FIG. 10 illustrates an example process for simplifying a plurality of ordered lists of points associated with one or more geometries, in accordance with at least one embodiment.

FIG. 10 illustrates an example process for simplifying a plurality of ordered lists of points associated with one or more geometries, in accordance with at least one embodiment. The example process 1000 may be performed by any suitable computing system or combination of systems, including for example the servers depicted in FIG. 13.

Although FIG. 10 is depicted as a series of steps or operations, the depicted sequence should not be viewed as limiting the scope of the present disclosure to only those embodiments that conform to the depicted sequence. For example, in various embodiments, the steps or operations depicted in the figure may be altered, reordered, or omitted, except where explicitly stated or where logically required, such as when an input to one step or operation is obtained from an output of another step or operation.

The example processes 1000 is similar, at least conceptually, to those just describe. However, in at least one embodiment, the system keeps a tree for each shape, such as a ring or linestring in the plurality of ordered lists. The nodes of this tree may be similar to the nodes described above, but may also contain a reference to the shape to which the node belongs. The algorithm proceeds similarly, and can process all the shapes in parallel. In at least one embodiment, the next tolerance for each iteration is chosen among all the nodes of all the trees, rather than from a single tree. One consequence of this is that not all the trees are necessarily extended at each step. In many cases, a single tree will be expanded at each step. One advantage of this approach is that a geometric simplification algorithm such as D-P, could be called using the tolerance at the end of each step and would produce a corresponding result.

At 1002, the system obtains a plurality of ordered lists. In at least one embodiment, these may represent a complex geometry comprising multiple shapes, or a plurality of separate geometries.

At 1004, the system generates a forest of trees to represent the lists. Here, the term forest simply refers to there being more than one tree.

At 1006, the system identifies MaxD from among all of the nodes in all of the trees of the forest. The current tolerance may then be reduced, and trees in the forest expanded according to the reduced tolerance.

At 1008, the system determines if the size of the lists is within a desired range. In some embodiments, size is constrained across all of the lists, so that the total number of points in all lists falls within some desired range. In other embodiments, each shape is restricted. Size may also be defined in terms of alternative descriptions, such as compression ratio.

If the desired size has not yet been reached, the algorithm may execute the operations of elements 1006 and 1008 again. Otherwise, simplified versions of the lists, or geometries, may be generated and outputted, as depicted by element 1010.

Figure 11:
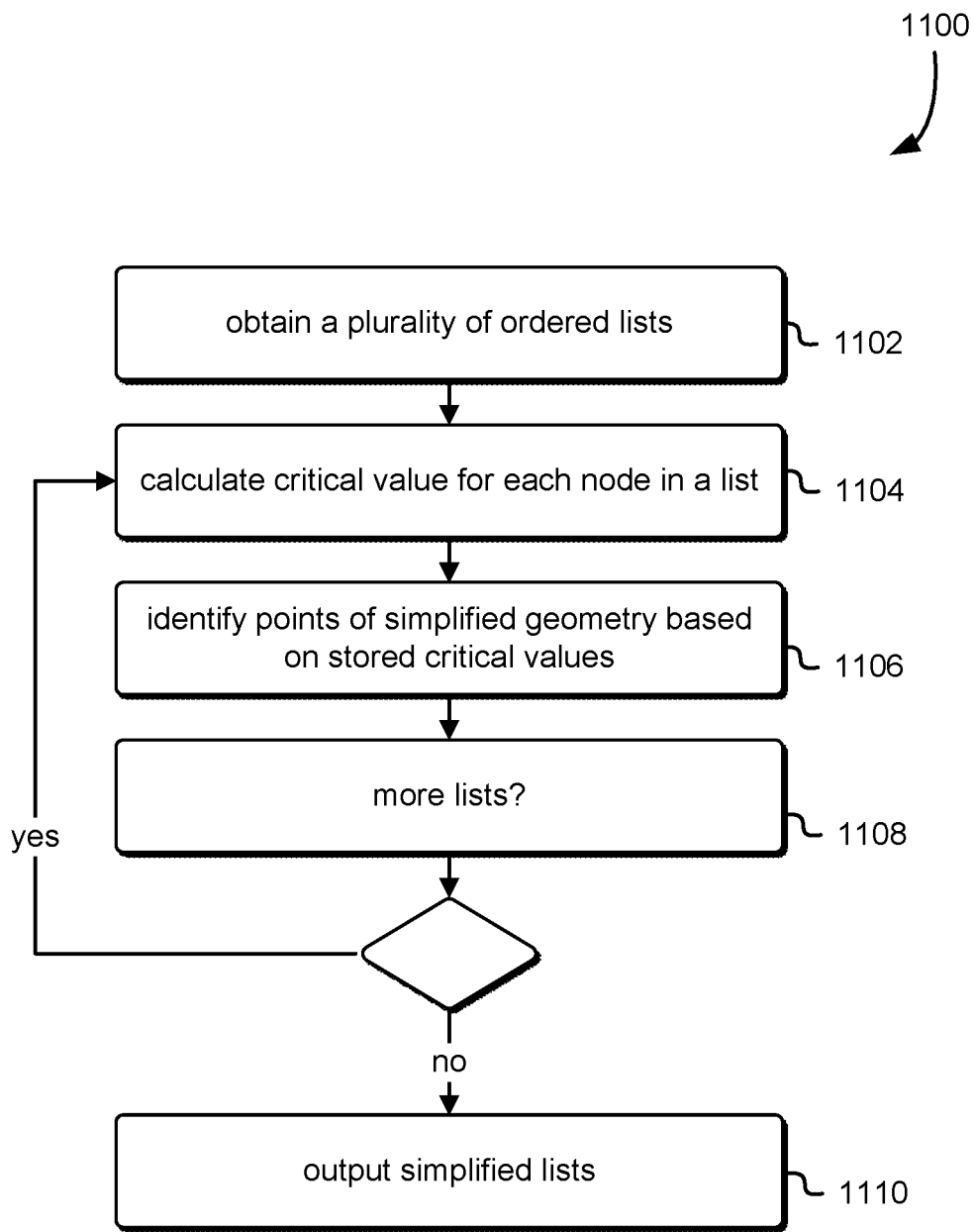
FIG. 11 illustrates an additional example process for simplifying a plurality of ordered lists of points associated with one or more geometries, in accordance with at least one embodiment.

FIG. 11 illustrates an additional example process for simplifying a plurality of ordered lists of points associated with one or more geometries, in accordance with at least one embodiment. The example process 1100 may be performed by any suitable computing system or combination of systems, including for example the servers depicted in FIG. 13.

Although FIG. 11 is depicted as a series of steps or operations, the depicted sequence should not be viewed as limiting the scope of the present disclosure to only those embodiments that conform to the depicted sequence. For example, in various embodiments, the steps or operations depicted in the figure may be altered, reordered, or omitted, except where explicitly stated or where logically required, such as when an input to one step or operation is obtained from an output of another step or operation.

In the example process 1100, an alternative approach is used in which each node is associated with a critical tolerance value for that node. This refers to a minimum value v such that the node would not be removed by a geometric simplification algorithm, such as D-P, if tolerance is less than or equal to v. Using this approach may allow the algorithm to be executed sequentially on each list of points, and may also be more memory efficient than other approaches, such as the one described in relation to FIG. 10.

In at least one embodiment, every time a node of a tree is expanded, there is an implicit computation of the critical value of the node MaxI, referring to the node that corresponds to the distance MaxD. However, the critical value is not necessarily MaxD. The MaxD of a node of the tree might be bigger than the critical value associated to the parent. For example, one node n1 of the tree could have MaxD equal to 1.0 and its parent could have MaxD equal to 0.7. A tolerance of 0.8 would not expand the parent node. Even when the child node has a MaxD that is bigger than the tolerance, the process would stop before arriving at n1, because its parent is already simplifiable and wouldn't expand. Accordingly, the critical value of a given node of the tree is equal to the minimum between the MaxD of the node and the critical value of the parent node. In at least one embodiment, each node of the tree is associated with, or stores, the corresponding critical value just described.

The critical value of a parent node in the tree is the minimum value between the critical values at points FROM and TO. Consequently, an implementation does not necessarily need to push anything onto a queue. In order to compute the minimum between the current MaxD and the critical value of the parent node in the tree, all which is needed are the critical values at FROM and TO. By construction, both of these values were already computed before in the flow of the algorithm.

Consistent with the above, in the example process 1100, a system obtains, at 1102, a plurality of ordered lists of points.

At 1104, the system calculates a critical value for each node in one of these lists. As noted above, the example process 1100 is capable of sequentially evaluating a plurality of ordered lists, while retaining a capability of producing results that, at stages, are equivalent to what a geometric simplification algorithm such as D-P would produce.

At 1106, the system identifies points of a simplified geometry, pertaining to the current list, based on the stored critical values.

At 1108, the system determines if more lists require processing, and if so re-executes steps 1104 to 1106. Otherwise, the set of simplified lists is output at 1110.

Figure 12:
FIG. 12 illustrates an example of pseudo-code for simplifying a plurality of ordered lists of points associated with one or more geometries, in accordance with at least one embodiment.

FIG. 12 illustrates an example of pseudo-code for simplifying a plurality of ordered lists of points associated with one or more geometries, in accordance with at least one embodiment. The pseudo-code implements an algorithm consistent with the techniques discussed in relation to FIG. 11.

As one skilled in the art will appreciate in light of this disclosure, certain embodiments may be capable of achieving certain advantages, including improvements to the operation of a database or data warehouse that stores spatial information, improvements to the operation of computer-implemented algorithms for searching or analyzing spatial information, and so forth.

Figure 13:
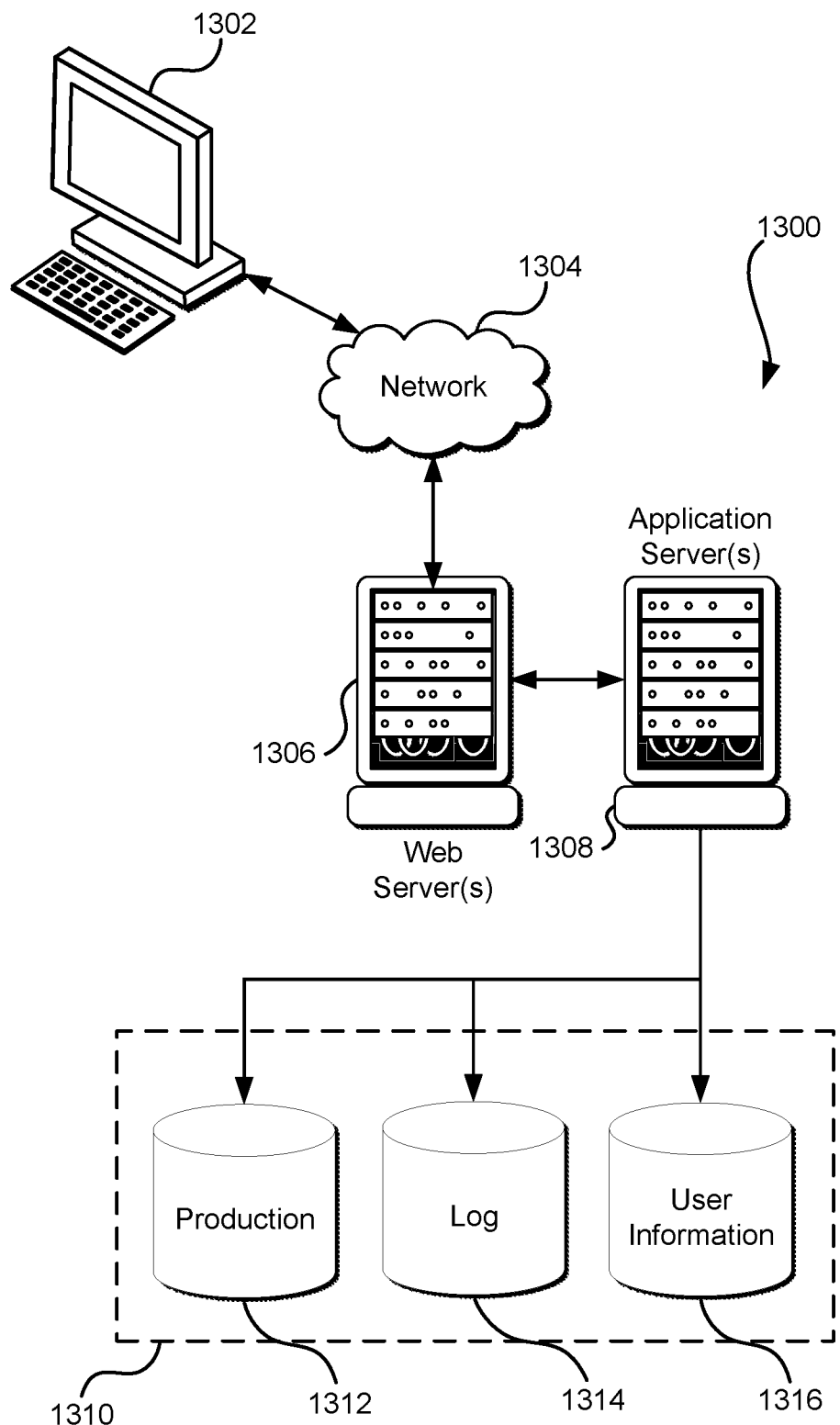
FIG. 13 illustrates a system in which various embodiments can be implemented.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, columnar data stores, relational data stores, data documents, dynamic data storage schemes and/or other data storage mechanisms and media for storing data relating to a particular aspect of the present disclosure. In an embodiment, data store 1310 stores spatial data using techniques described herein. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers. Data for these databases may be stored in any number of formats, such as row-oriented or column-oriented storage. In an embodiment, any of the database servers may store spatial data using techniques described herein.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into a non-transitory memory. The instructions, as a result of execution by one or more processors, cause the one or more processors to execute instructions to perform tasks. In at least one embodiment, a computer system is configured to perform a task through a software application that controls the execution of specific commands, requests, tasks, jobs, and so forth. A computer system may be configured to execute computer-readable instructions encoded in a software application by loading executable code of the software application into memory and using one or more processors of the computer system to run the executable instructions.

The specification and drawings herein are to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   at least one memory comprising instructions that, when executed by the at least one processor, cause the system to at least:
   receive a first plurality of points representative of a geometry;
   generate a first simplified version of the geometry based, at least in part, on the first plurality of points;
   determine a target size of a second simplified version of the geometry, the target size based at least in part on capacity for storing data in a column of a database;
   generate a second plurality of points with a greater number of points than the first simplified version of the geometry, based at least in part on a tolerance value and a determination that a point associated with a segment of the first simplified version of the geometry is at a distance from the segment greater than the tolerance value and that the segment can be expanded by adding one or more additional points without exceeding the target size; and
   store the second plurality of points in the column of the database, the second plurality of points representing the second simplified version of the geometry.

2. The system of claim 1, wherein the column comprises spatial data.

3. The system of claim 1, wherein the at least one memory comprising instructions that, when executed by the at least one processor, cause the system to at least:
   generate a tree comprising a node representing the segment of the simplified version of the geometry; and
   determine to expand the node of the tree based, at least in part, on the tolerance value, wherein the node is expanded by adding one or more additional nodes, representing one or more additional segments of the first simplified geometry, to the tree.

4. The system of claim 1, wherein the at least one memory comprising instructions that, when executed by the at least one processor, cause the system to at least:
   identify a tolerance value useable, by a Douglas-Peucker geometric simplification algorithm, to generate a simplified geometry not exceeding the target size.

5. A method, comprising:
   receiving a first plurality of points representative of a geometry;
   generating a first simplified version of the geometry;
   identifying a target size of a second simplified version of the geometry, the target size based at least in part on capacity for storing data in a column of a database;
   generating a second plurality of points with a greater number of points than the first simplified version of the geometry, wherein the second plurality of points is generated based, at least in part, on expanding a segment of the first simplified version of the geometry, wherein the segment is identified based at least in part on determining that a point associated with the segment is at a distance from the segment that is greater than a tolerance value, and that the segment can be expanded by adding one or more additional points without the second simplified version of the geometry exceeding the target size; and storing the second plurality of points, to represent the second simplified version of the geometry, in the column of the database.

6. The method of claim 5, further comprising: identifying the target size based, at least in part, on storage capacity available for storing data in the column of the database.

7. The method of claim 5, further comprising:
generating a tree comprising a node representing the segment of the first simplified version of the geometry.

8. The method of claim 7, further comprising:
expanding the segment by adding one or more additional nodes to the tree, the one or more additional nodes representing one or more additional segments of the first simplified version of the geometry.

9. The method of claim 7, further comprising:
determining a number of points that would be included in the second plurality of points based, at least in part, on leaf nodes of the tree.

10. The method of claim 5, further comprising:
determining to expand one or more additional segments of the first simplified version of the geometry, based at least in part on a reduced tolerance value.

11. The method of claim 10, wherein the reduced tolerance value is determined based, at least in part, on a maximum distance of a point associated with the segment of the first simplified version of the geometry.

12. The method of claim 5, further comprising:
identifying a plurality of critical tolerance values associated with segments of the first simplified version of the geometry; and
generating the second plurality of points based, at least in part, on the plurality of critical tolerance values.

13. The method of claim 5, further comprising:
generating a forest of trees to represent a plurality of simplified versions of a plurality of geometries; and
expanding one or more nodes in the forest of trees.

14. A non-transitory computer-readable storage medium storing thereon executable instructions that, as a result of execution by one or more processors of a computer system, cause the computer system to at least:
receive a first plurality of points representative of a geometry;
generate a first simplified version of the geometry;
determine a target size of a second simplified version of the geometry, the target size based at least in part on capacity for storing data in a column of a database;
generate a second plurality of points based, at least in part, on identifying a segment of the geometry to expand, wherein the segment is identified based at least in part on one or more points associated with the segment that are at a distance from the segment greater than a tolerance value associated with the segment, and a determination that the second plurality of points could include the one or more points, without causing the second simplified version of the geometry to exceed the target size; and
store the second plurality of points, the second plurality of points indicative of the second simplified version of the geometry, in the column of the database.

15. The non-transitory computer-readable storage medium of claim 14, wherein a maximum number of points is determined based, at least in part, on an amount of storage allocated for storing the second simplified version of the geometry in the column of the database.

16. The non-transitory computer-readable storage medium of claim 14, wherein the instructions, as a result of execution by the one or more processors, cause the computer system to at least:
generate a tree comprising a node representing the segment of the first simplified version of the geometry; and
expand the node of the tree based, at least in part, on determining that the second plurality of points comprises an insufficient number of points and based, at least in part, on the tolerance value.

17. The non-transitory computer-readable storage medium of claim 14, wherein the instructions, as a result of execution by the one or more processors, cause the computer system to at least:
generate a structure comprising a node indicative of the segment of the first simplified version of the geometry;
mark the node of the structure based, at least in part, on the tolerance value, wherein the node is expanded by adding one or more additional nodes, indicative of one or more additional segments of the simplified geometry, to the structure; and
generate the second plurality of points based at least in part on the marked node.

18. The non-transitory computer-readable storage medium of claim 14, wherein the instructions, as a result of execution by the one or more processors, cause the computer system to at least:
determine a number of points that would be excluded from the second plurality of points based, at least in part, on counting points of the first plurality of points whose distance from the segment is less than the tolerance value.

19. The non-transitory computer-readable storage medium of claim 14, wherein the instructions, as a result of execution by the one or more processors, cause the computer system to at least:
identify a second tolerance value less than the tolerance value;
identify one or more additional points in a subsegment of the segment that are at a distance from the subsegment that is greater than the second tolerance value; and
include the one or more additional points in the second plurality of points.

20. The non-transitory computer-readable storage medium of claim 14, wherein the instructions, as a result of execution by the one or more processors, cause the computer system to at least:
identify a plurality of tolerance values based, at least in part, on a structure comprising nodes indicative of segments of the first simplified version of the geometry; and
generate the second plurality of points based, at least in part, on the plurality of tolerance values.

* * * * *